(12) United States Patent
Martin et al.

(10) Patent No.: US 7,976,660 B2
(45) Date of Patent: Jul. 12, 2011

(54) DEVICE AND METHOD FOR GUIDING A THREAD

(75) Inventors: Pascal Martin, Corent (FR); Jean-Louis Souche, Taluyers (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 663 days.

(21) Appl. No.: 11/982,606

(22) Filed: Nov. 2, 2007

(65) Prior Publication Data
US 2008/0105359 A1 May 8, 2008

(30) Foreign Application Priority Data

Nov. 2, 2006 (FR) ...................................... 06 09647

(51) Int. Cl.
*B29D 30/00* (2006.01)
*B29D 30/06* (2006.01)
(52) U.S. Cl. ............ 156/117; 156/256; 156/397; 83/105
(58) Field of Classification Search .................... 83/105, 83/106, 162; 156/117, 250, 264, 397, 441, 156/181, 521
See application file for complete search history.

(56) References Cited

U.S. PATENT DOCUMENTS

| | | | |
|---|---|---|---|
| 3,570,353 A | 3/1971 | Hess | |
| 3,680,616 A * | 8/1972 | Rejsa | 83/26 |
| 3,894,906 A | 7/1975 | Pearce et al. | |
| 5,971,050 A * | 10/1999 | Debroche | 156/397 |
| 6,969,438 B2 * | 11/2005 | Debroche | 156/117 |

FOREIGN PATENT DOCUMENTS

| | | |
|---|---|---|
| DE | 22 33 999 | 1/1974 |
| EP | 0 845 348 | 6/1998 |
| EP | 1 147 864 | 10/2001 |
| JP | 62-222824 | 9/1987 |
| WO | WO 02/20898 | 3/2002 |

OTHER PUBLICATIONS

Search Report dated Nov. 20, 2007 issued for the corresponding European Patent Application No. EP 07 11 0939.

* cited by examiner

*Primary Examiner* — Sam C Yao
(74) *Attorney, Agent, or Firm* — Cohen Pontani Lieberman & Pavane LLP

(57) ABSTRACT

An apparatus for manufacturing a reinforcement from a thread laid down directly in its final location by projecting lengths of the thread onto a receiving surface (S). The apparatus has feed means for feeding thread from a source of thread, a rotary conduit (2) receiving the thread, thread-cutting device has a roller fixed with respect to the thread, and a moving cutter acting on the thread in collaboration with said roller so as, for each revolution of the rotary conduit, to release a length having a free end at the cutting means end. The apparatus also has a buffer positioned in the path of the free end so that, during the operation, the free end strikes the buffer before coming into contact with the receiving surface (S).

6 Claims, 5 Drawing Sheets

DEVICE AND METHOD FOR GUIDING A THREAD

RELATED APPLICATION

This application claims the priority of French application no. 06/09647 filed Nov. 2, 2006 the entire content of which is hereby incorporated by reference.

FIELD OF THE INVENTION

The invention relates in particular to the manufacture of tires and is more precisely concerned with the manufacture of reinforcements.

BACKGROUND OF THE INVENTION

More specifically, the invention relates to an improvement to an apparatus intended to lay reinforcing elements intended to form the reinforcement positioned under the tread of a tire.

An apparatus of this type is known from the prior art and is described in detail in publication EP 248 301. An apparatus of this type allows the lengths of thread intended to form the reinforcement of the tire to be projected onto a receiving surface, in the manner of a whip lash.

FIG. 1 illustrates an apparatus of this type employing this principle. An apparatus such as this uses a thread 1 packaged, for example, in the form of a feed reel, not depicted. The apparatus projects lengths of thread onto a receiving surface (not depicted) which may consist of the surface of the tire or alternatively may consist of any other surface such as a crown-reinforcing ring intended to be transferred onto the tire preform or alternatively a flat surface intended to form a crown-reinforcing ply in the form of a semi-finished product.

The term "thread" is to be understood in its broadest sense, covering a monofilament, a multifilament, a twisted cord or a folded yarn or equivalent assembly, and for this to be true irrespective of the material of which the yarn is made or of the treatment it may undergo, for example a surface treatment to encourage it to bond closely with rubber, or alternatively, a rubberizing treatment encasing the said thread in a coat of rubber to allow it to adhere directly to the support when it is projected.

Said apparatus comprises:
- feed means 11 for feeding thread 1 from a source of thread,
  a rotary conduit 2 fixed to a shaft 20 constituting the axis of rotation of the said conduit, so that the outer radial end 21 of the said conduit is directed substantially radially with respect to the axis of rotation, the said conduit receiving the thread 1 via its central end 22 which is the opposite end to the said outer radial end 21 arriving from the said feed means, the said thread leaving via the said outer radial end, the said feed means controlling the linear rate of advance of the thread inside the said rotary conduit,
- means for rotating the said rotary conduit,
- thread-cutting means (31, 24) acting on the thread in such a way as to release one length for each revolution of the said rotary conduit.

For further details regarding the operation of this apparatus it is suggested that the aforementioned publication EP 248 301 be consulted.

This apparatus may further comprise a thread guide 4 to receive and guide the lengths of thread, as is also described in publication EP 248 301, and in publications EP 845 348 or EP 845 349.

One aspect of the invention relates to the cutting system used in this type of apparatus.

Indeed, it has been demonstrated that the length of thread deforms during its free travel under the action of the energy stored up at the time of cutting. This deformation is therefore liable to alter appreciably the configuration of the thread when it "lands" on the receiving surface.

SUMMARY OF THE INVENTION

It is an object of the invention to correct this phenomenon. To do this, a buffer is positioned in the path of the free end of the length of thread liable to become deformed so that, when the device is operating, said end strikes said buffer before coming into contact with said receiving surface S.

BRIEF DESCRIPTION OF THE DRAWINGS

The description which follows depicts particular embodiments of the invention, with reference to FIGS. 1 to 9 in which.

DETAILED DESCRIPTION OF THE DRAWINGS

Figure 1:
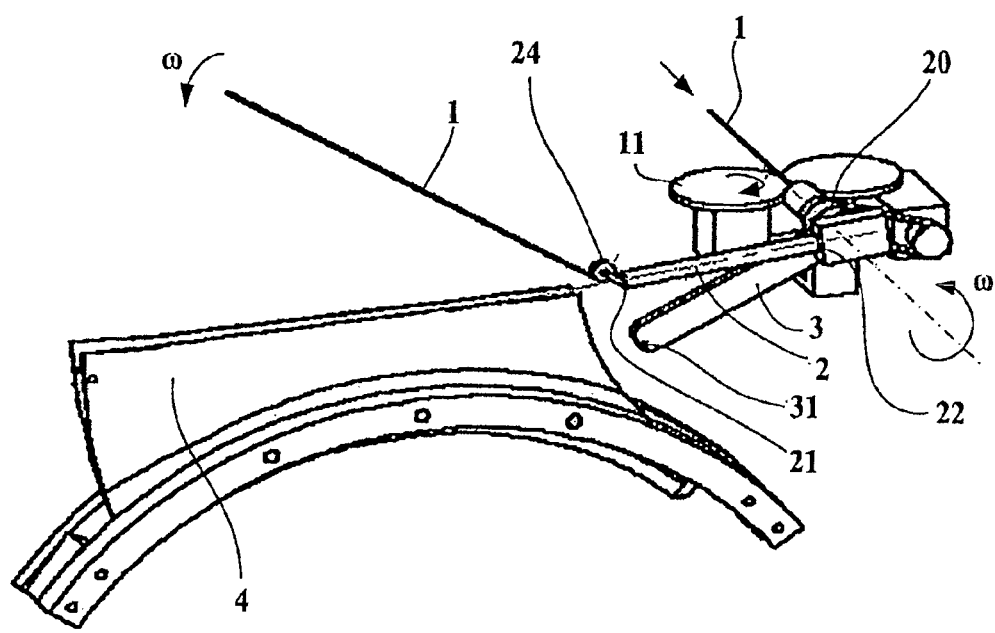
FIG. 1 depicts a schematic perspective view of a laying device.

To make the description which follows easier to understand, the reference numeral 1 will be used to denote the uncut thread and the reference numeral 10 will be used to denote the length of thread when this length has been separated from the uncut thread. Likewise, the length of thread comprises two ends, denoted by the reference numerals 10a and 10b respectively, the end 10a corresponding to the end furthest from the cutting assembly, and the end 10b corresponding to the end closest to the cutting assembly and therefore to the outer radial end 21 of the rotary conduit 2.

The means for cutting the thread 1 in such a way as to release a length of thread 10 are, as a general rule, formed of a cutter 31 mounted on a fixed arm 3 and of a roller 24 used to guide the thread as it leaves the rotary conduit 2 member that acts also as a kind of anvil. One of these elements is allowed to move relative to the other. The thread is held by the roller 24 and is cut by the cutter 31.

It has been demonstrated that the action of the cutter 31 on the thread has the effect of imparting a certain amount of momentum to the end 10b of the length of thread positioned closest to the cutting means. This momentum is in the direction in which the cutter or moving part of the cutting means moves.

Furthermore, once released by cutting, the length of thread 10 moves freely through space before meeting the laying surface. It therefore follows that, during this free movement, the end 10b will restore the momentum by causing the said end to move in the opposite direction, this having the effect of deforming the end 10b and of locally appreciably altering the generally straight shape of the length of thread 10.

FIGS. 2 to 5 explain and provide a schematic visual analysis of the physical phenomenon the effects of which the invention seeks to correct.

The thread 1 is paid out by the feed means in such a way as to deliver the desired actual length of thread for each rotation of the rotary conduit 2. The cutter 31 is positioned at the end of a fixed arm 3. The roller 24 is positioned at the radial end of the conduit 2 which rotates about its axis at a rotational speed equal to ω. The roller 24 is fixed in the relative frame of reference of the thread. The thread 1 is cut as the arm 2 moves past the cutter 31. The cutter has a relative speed equal to −ω with respect to the roller 24 and to the thread 1.

Figure 2:
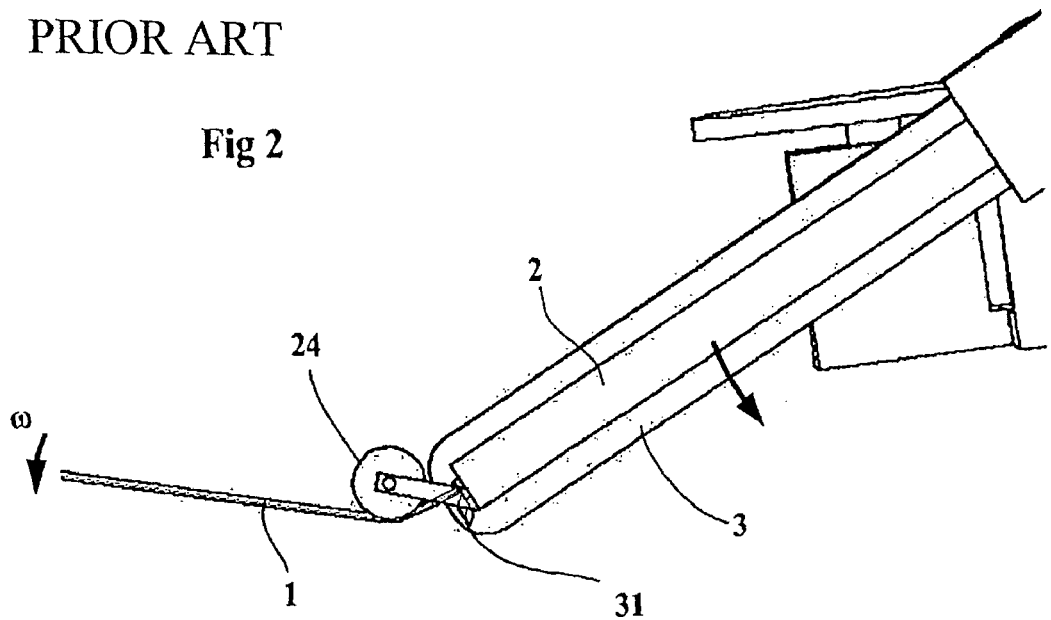
FIGS. 2 to 5 depict schematic views of the dynamics of the thread and of the length of thread before and after cutting.
Figure 3:
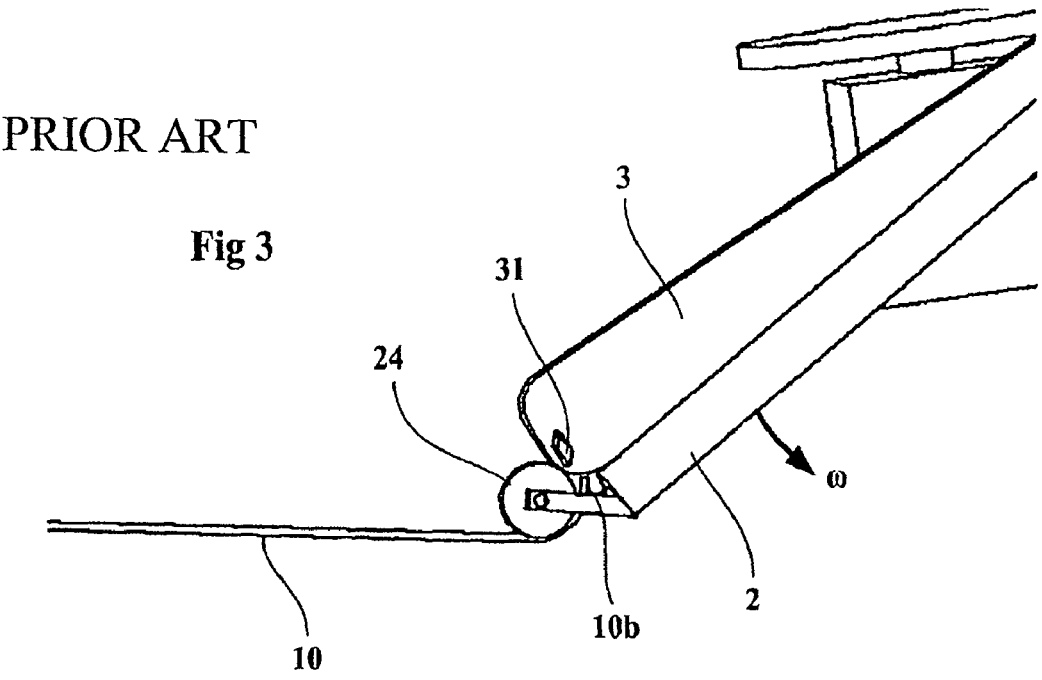

FIG. 2 depicts the respective positions of the thread 1, of the roller 24, and of the cutter 31, just before cutting. FIG. 3 shows the shape of the end 10b just after the cutter 31 has passed. It can be seen that, at that moment, the end 10b of the length 10 pivots about the roller 24 and that the end is carried along by the cutter 31.

Figure 4:
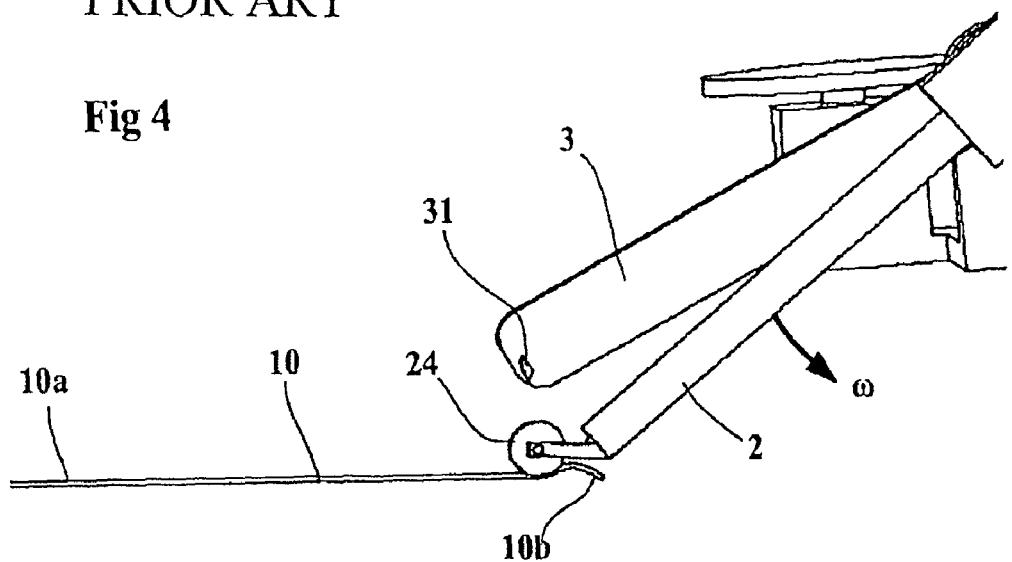
Figure 5:
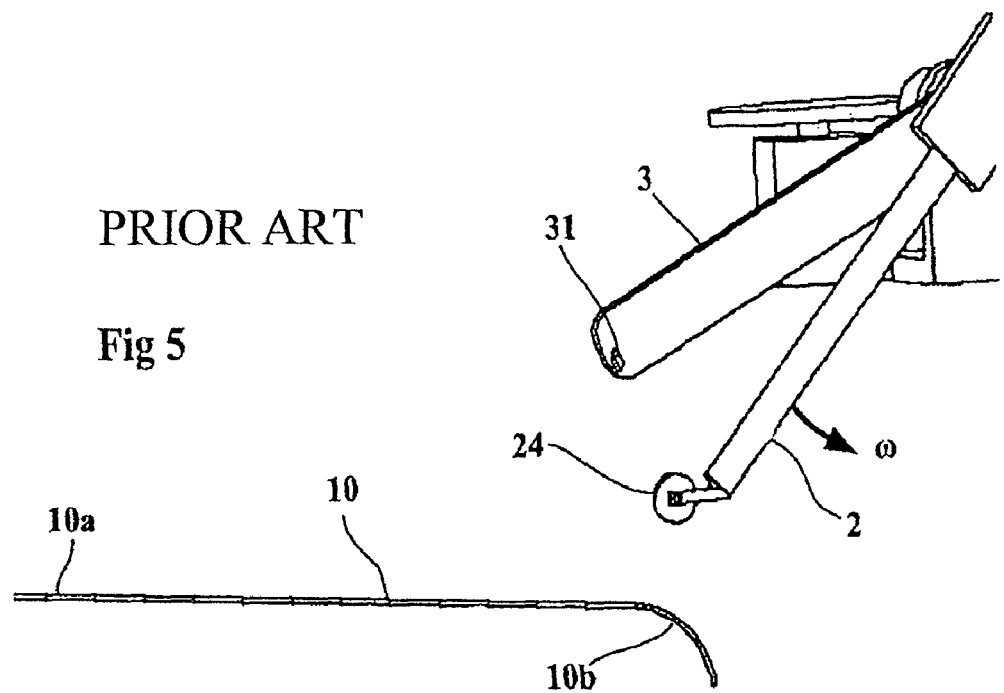

FIG. 4 shows the length 10 which has been projected towards the receiving surface S (not depicted) while the length is in the process of disengaging itself from the end of the rotary conduit 2. The end 10b is therefore still in contact with the roller 24 and pivots about this point in the opposite direction to the direction in which the cutter moves with respect to the thread. In this configuration, the end 10b becomes inclined in the direction in which the thread moves, as is depicted in FIG. 5, which shows that the length of thread has a generally straight shape and that the end 10b is curved towards the receiving surface.

What this phenomenon means is that, in certain operating speed ranges, when the thread "lands" on the receiving surface S, the end 10b is not positioned accurately and repeatably enough with respect to the criteria adopted in order to give the tire all the desired performance.

It is an object of the invention to combat this phenomenon of the end of the length of thread deforming in such a way that the length of thread has a substantially straight shape as it comes into contact with the receiving surface.

In order to achieve the desired result, it is proposed that a buffer 25 be installed, this buffer being positioned in the path of the free end 10b of the length of thread 10 in such a way that the said end 10b strikes the said buffer before coming into contact with the receiving surface.

The effect of the impact between the buffer and the free end 10b of the length 10 is to impart to the end an amount of momentum substantially equivalent to, but in the opposite direction from, the momentum acquired by the thread after it has rotated about the roller 24 and which is imparted by the movement of the cutter. The restitution of this momentum allows the free end 10b to realign itself with the rest of the length of thread 10.

The invention also relates to the method employing the device.

This method of producing a reinforcement for a tire, the said reinforcement comprising adjacent and substantially parallel threads is a method of the type in which each length of thread 10 is projected individually into its position on a receiving surface S. The lengths of thread 10 are projected by rotating means 2, the receiving surface and the thread having self-stick properties.

The rotating means comprise
  feed means 11 for feeding thread 1 from a source of thread,
  a rotary conduit 2 fixed to a shaft 20 constituting the axis of rotation of the conduit, so that the outer radial end 21 of the conduit is directed substantially radially with respect to the axis of rotation, the conduit receiving the thread 1 via its central end 22 which is the opposite end to the outer radial end 21 arriving from the feed means, the thread leaving via the outer radial end, the feed means controlling the rate of advance of the thread inside the rotary conduit,
  means for rotating the rotary conduit,
  thread-cutting means comprising a roller 24 which is fixed with respect to the thread, and a moving cutter 31 acting on the thread in collaboration with the roller 24 so as, for each revolution of the rotary conduit, to release a length 10 of which the end 10b is the end of the length at the cutting means end.

This method is characterized in that the end 10b of the length of thread strikes a buffer 25 before coming into contact with the receiving surface S.

Figure 6:
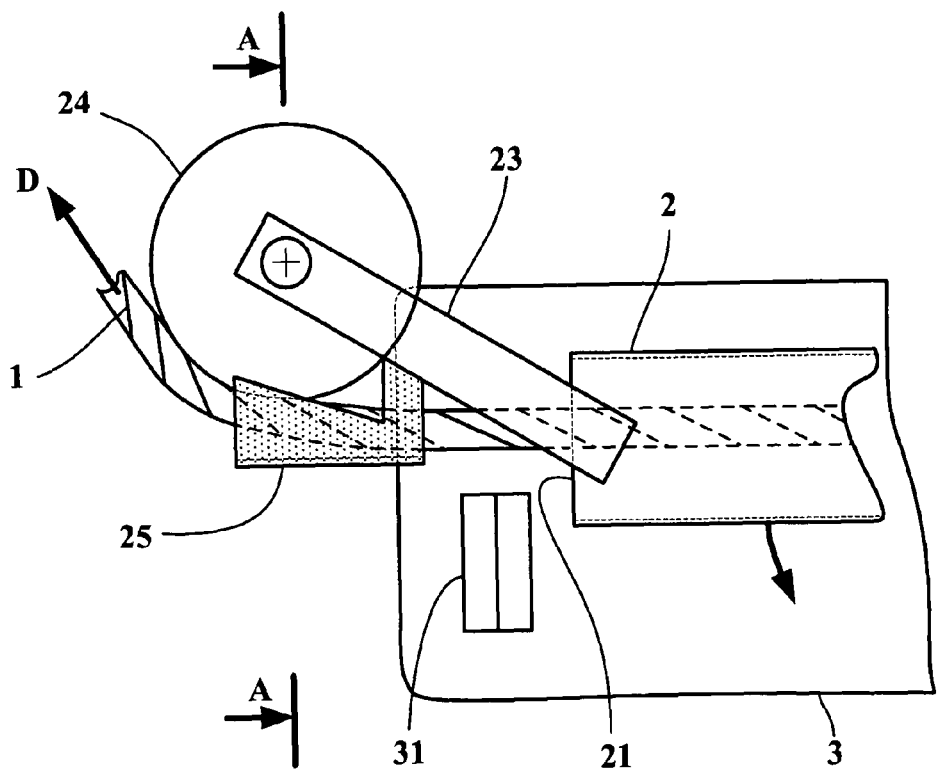
FIG. 6 depicts a schematic side view of a cutting device equipped with a buffer according to the invention.
Figure 7:
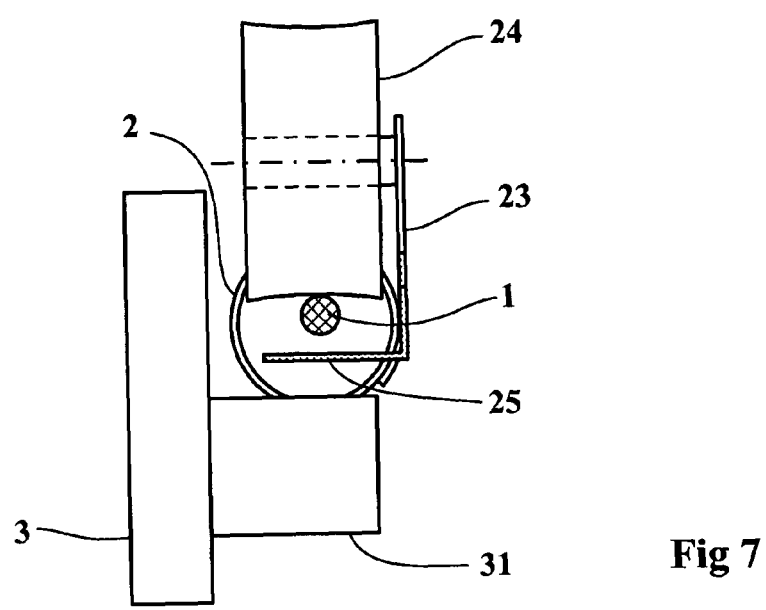
FIG. 7 depicts the same device in transverse section on AA.
Figure 8:
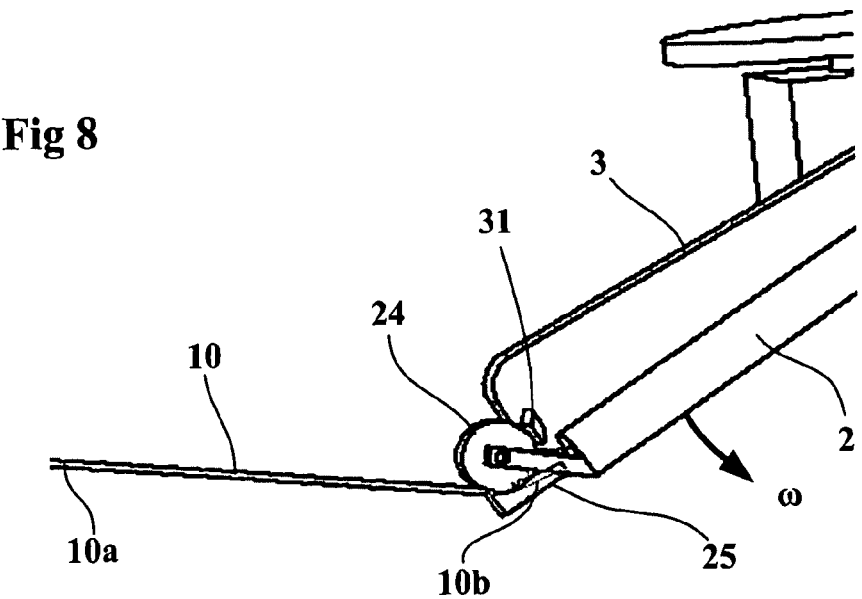
FIGS. 8 and 9 depict schematically the dynamics of the end 10b of the length of thread 10 when the cutting means is equipped with a buffer according to the invention.
Figure 9:
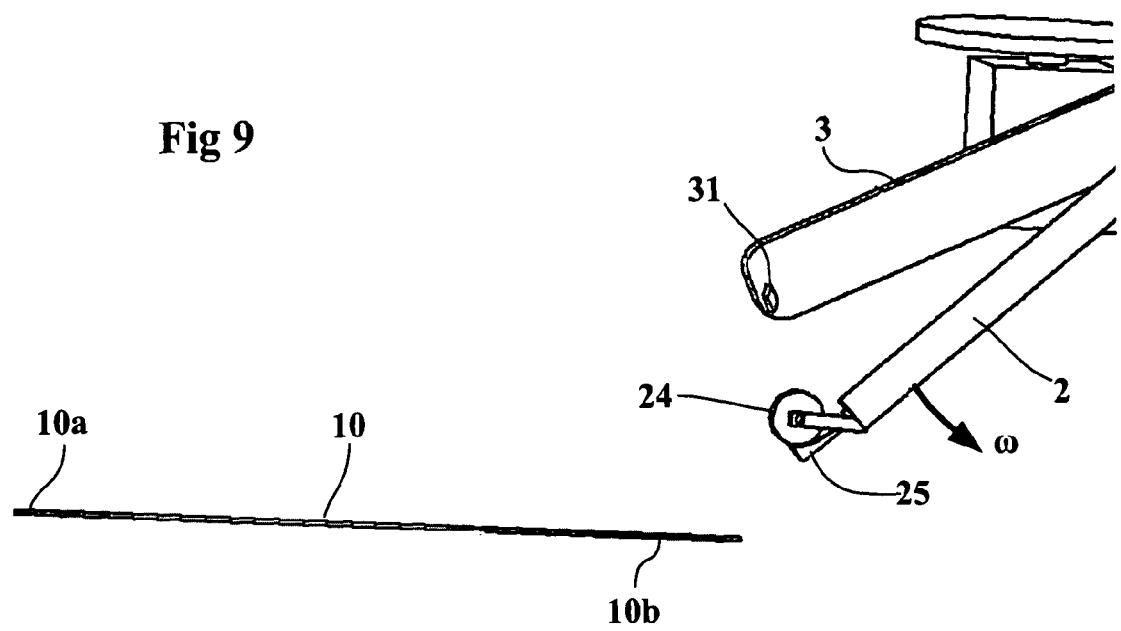

FIG. 6 depicts the rotary conduit 2 in the position preceding the cutting of the thread 1 by the cutter 31.

The thread 1 leaves the rotary conduit 2 via the radial end 21 of the said conduit. The said rotary conduit is rotationally driven by rotation means (not depicted). The feed means 11 (not depicted) deliver a desired length of thread which, under the effect of centrifugal force, deploys in space in the manner of a whip lash in the direction of the arrow D.

A roller 24 is fixed to the end of the rotary conduit via a support 23. The roller may also serve as a means to guide the thread 1 as it leaves the rotary conduit and may equally well be mounted on a rotary spindle.

A buffer 25 is positioned under the roller 24. The buffer is secured to the end of the conduit by a fastener attached to the support 23 of the roller 24.

It is contrived for the said buffer to be positioned in the path of the free end 10b of the length of thread 10.

In practice, it is possible to determine the path of the length of thread quite accurately using a stroboscopic illuminating means coupled to a photographic recording means triggered by the illuminating means. In that way it is possible to monitor the path of the length of thread and determine the position of the buffer.

The preferred embodiment is to position the buffer on the rotary conduit. This embodiment in practice allows the shape of the thread to be corrected very accurately as soon as it leaves the rotary conduit, while at the same time minimizing the bulk of the device.

The shape of the buffer is determined by the specific length to bring it into contact with the end 10b of the length of thread 10, which specific length is dependent on the amount of energy that has to be imparted to the said end in order to straighten it. In practice, this length ranges between about 5 mm and about 15 mm.

It has also been found that the fact that the conduit is rotating with respect to the length of thread 10 at the time of the impact played a subsidiary part in obtaining the desired result.

The arm 3 is fixed with respect to the rotary conduit 2 and has a cutter 31 at its end.

Under the effect of the relative rotary movement of the conduit with respect to the arm, the cutter 31 slices through the thread 1 which is held by the roller 24.

The subject of the present description is a preferred embodiment of the invention that allows the shape of the end 10b of the length of thread to be corrected before it "lands" on the receiving surface. However, a person skilled in the art will be able to adapt the layout of the various components in order to achieve the effect he is seeking to achieve.

The invention claimed is:

1. A device for manufacturing a reinforcement from a thread laid down directly in its final location by projecting lengths of the thread onto a receiving surface (S), the device comprising:
   feed means for feeding a thread from a source of thread;
   a rotary conduit fixed to a shaft constituting an axis of rotation of said rotary conduit, so that an outer radial end of said rotary conduit is directed substantially radially with respect to the axis of rotation, said rotary conduit receiving the thread via a central end which is opposite to said outer radial end arriving from the feed means, the thread leaving via said outer radial end, said feed means controlling a rate of advance of the thread inside said rotary conduit;
   means for rotating said rotary conduit;
   thread-cutting means comprising a roller which is fixed with respect to the thread, and a cutter mounted on a fixed arm acting on the thread in collaboration with said roller so as, for each revolution of said rotary conduit, to release a length of the thread, which has a free end at an end of the cutting means; and
   a buffer positioned in a path of the free end so that, when the device is operating, the length of the thread does not enter in contact with said buffer, except for said free end which strikes said buffer before coming into contact with the receiving surface (S).

2. The device according to claim 1, wherein the buffer is fixed to the outer radial end of the rotary conduit.

3. The device according to claim 1, wherein the roller is positioned at the outer radial end of the rotary conduit and guides the thread as it leaves the rotary conduit.

4. The device according to claim 1, wherein the cutter is positioned on an arm that is fixed with respect to the rotary conduit.

5. The device according to claim 1, wherein the free end of the length is curved before striking said buffer and said buffer is configured to straighten the free end so that the free end is realigned with the remainder of the length of the thread.

6. A method of producing a reinforcement for a tire, the reinforcement comprising adjacent and substantially parallel threads, in which method each length of thread is projected individually into its position by rotating means onto a receiving surface (S), the receiving surface and the thread having self-stick properties, in which method the rotating means comprise:
   feed means for feeding a thread from a source of thread,
   a rotary conduit fixed to a shaft constituting an axis of rotation of the rotary conduit, so that an outer radial end of the rotary conduit is directed substantially radially with respect to the axis of rotation, the rotary conduit receiving the thread via a central end which is opposite to the outer radial end arriving from the feed means, the thread leaving via the outer radial end, the feed means controlling a linear rate of advance of the thread inside the rotary conduit,
   means for rotating the rotary conduit, and
   thread-cutting means comprising a roller which is fixed with respect to the thread, and a moving cutter acting on the thread in collaboration with the roller so as, for each revolution of the rotary conduit, to release a length of thread having a free end at an end of the cutting means,
   wherein the free end of the length of thread strikes a buffer before coming into contact with the receiving surface (S) while the rest of the length of the thread does not come into contact with said buffer.

* * * * *